US 6,823,396 B1

(12) United States Patent
Biedermann et al.

(10) Patent No.: US 6,823,396 B1
(45) Date of Patent: Nov. 23, 2004

(54) METHOD FOR CONTROLLING DATA TRANSMISSION IN A WIRELESS V.24 DATA TRANSMISSION SYSTEM OPERATING BETWEEN A DATA TERMINAL AND A DATA TRANSMISSION DEVICE FOR DATA TELECOMMUNICATION

(75) Inventors: Rolf Biedermann, Ahaus (DE); Diego Garcia Alfaro, Schenefeld (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/762,835
(22) PCT Filed: Aug. 4, 1999
(86) PCT No.: PCT/DE99/02418

§ 371 (c)(1),
(2), (4) Date: Feb. 12, 2001

(87) PCT Pub. No.: WO00/10291

PCT Pub. Date: Feb. 24, 2000

(30) Foreign Application Priority Data

Aug. 12, 1998 (DE) ............................................. 19836610

(51) Int. Cl.[7] .............................................. G06F 15/16
(52) U.S. Cl. ........................ 709/246; 709/233; 709/235
(58) Field of Search ............................... 709/203, 246, 709/201, 207, 219, 228, 231, 236, 400, 239, 251, 233, 235; 370/330, 493, 347, 338, 349, 260; 380/29, 247; 705/39, 28; 455/517, 426, 63, 436; 375/267, 364, 149, 139; 345/600; 713/500; 708/204; 341/50

(56) References Cited

U.S. PATENT DOCUMENTS 5,142,538 A    8/1992  Fickes et al.
5,305,384 A *  4/1994  Ashby et al. ................ 380/29
5,446,759 A *  8/1995  Campana, Jr. ............... 375/267

(List continued on next page.)

FOREIGN PATENT DOCUMENTS

| DE | 195 45 767      | 6/1996  |
| DE | 297 14 588 U1   | 11/1997 |
| EP | 0 836 339       | 4/1998  |
| WO | 96/38991        | 12/1996 |
| WO | 97/41700        | 11/1997 |

OTHER PUBLICATIONS

Swan: An Indoor Wireless ATM Network—Hyden (1995); www.deas.harvard.edu/cs/academics/courses/cs248r/readings/icupc95.ps.gz.*

(List continued on next page.)

Primary Examiner—Thong Vu
(74) Attorney, Agent, or Firm—Bell Boyd & Lloyd LLC

(57) ABSTRACT

A method for controlling data transmission in a wireless V.24 data transmission system operating between a data terminal and a data transmission device. The data transmission system has a first data transmission apparatus connected to a data terminal by means of a V.24 cable and a second data transmission apparatus also connected to a data transmission device by means of a V.24 cable. An air interface may be used for wireless telecommunications in order to control transmission of control commands or control information for the data transmission device from the data terminal to the data transmission device. Recognizability of control commands or control information for the data transmission device is ensured, once a time-critical control command is made known in the data transmission apparatuses. After transmission has been completed on the transmission path between the first data transmission apparatus and the data terminal, the time sequence of the transmission of the control command on the transmission path between the second data transmission apparatus and the data transmission device is identically reconstructed, despite any asynchronous data transmission caused by the air interface in the wireless V.24 data transmission system.

6 Claims, 3 Drawing Sheets

U.S. PATENT DOCUMENTS

| | | | | |
|---|---|---|---|---|
| 5,574,979 A | * | 11/1996 | West | 455/63.1 |
| 5,657,317 A | * | 8/1997 | Mahany et al. | 370/338 |
| 5,699,519 A | * | 12/1997 | Shiobara | 709/235 |
| 5,708,716 A | * | 1/1998 | Tisdale et al. | 380/247 |
| 5,726,984 A | * | 3/1998 | Kubler et al. | 370/349 |
| 5,737,369 A | * | 4/1998 | Retzer | 375/346 |
| 5,748,682 A | * | 5/1998 | Mobin | 375/344 |
| 5,774,876 A | * | 6/1998 | Woolley et al. | 705/28 |
| 5,812,534 A | * | 9/1998 | Davis et al. | 370/260 |
| 5,842,125 A | * | 11/1998 | Modzelesky et al. | 455/426.1 |
| 5,940,771 A | * | 8/1999 | Gollnick et al. | 455/517 |
| 6,006,270 A | * | 12/1999 | Kobunaya | 709/233 |
| 6,044,205 A | * | 3/2000 | Reed et al. | 709/201 |
| 6,138,019 A | * | 10/2000 | Trompower et al. | 455/436 |
| 6,240,076 B1 | * | 5/2001 | Kanerva et al. | 370/330 |
| 6,314,129 B1 | * | 11/2001 | Sunwoo et al. | 375/149 |
| 6,332,133 B1 | * | 12/2001 | Takayama | 705/39 |
| 6,377,271 B1 | * | 4/2002 | Muta et al. | 345/600 |
| 6,415,410 B1 | * | 7/2002 | Kanerva et al. | 714/749 |
| 6,452,947 B1 | * | 9/2002 | Kojima et al. | 370/493 |
| 6,466,609 B2 | * | 10/2002 | Koslar et al. | 375/139 |
| 6,477,370 B1 | * | 11/2002 | Sigler et al. | 455/427 |
| 6,674,741 B1 | * | 1/2004 | Räsänen | 370/347 |

OTHER PUBLICATIONS

Efficient Path Profiling—Ball, Larus (1996); www.stanford.edu/class/cs343/ps/pathprof.ps.*

Setting Up a Modem on a Unix Workstation: Don't try this at home—Outerbridge; maelstrom.seos,uvic.ca/pub/ramo/modemsetup.ps.*

Nachrichtentechnik Elektronik 42, Jan./Feb. 1992, No. 1, Berlin, DE; U. Pilger "Struktur des DECT—Standards," pp. 23–29.

ETSI—Publication, Oct. 1992, ETS 300175 1 . . . 9, Part 1: Overview, pp. 1–30; Part 2: Physical layer, pp. 1–39; Part 3: Medium access control layer, pp. 1–197; Part 4: Data link control layer, pp. 1–128; Part 5: Network layer, pp. 1–241; Part 6: Identities and addressing, pp. 1–41; Part 7: Security features, pp. 1–104; Part 8: Speech coding and transmission, pp. 1–39; Part 9: Public access profile, pp. 1–71.

DECT—Publikation des DECT—Forums, Feb. 1997, pp. 1–16.

Informatik Spektrum 14, Jun. 1991, No. 3, Berlin, A. Mann, "Der GSM–Standard—Grundlage für digitale europäische Mobilfunknetze", pp. 137–152.

Telekom praxis 4/1993, P. Smolka "GSM—Funkschnittstelle—Elemente und Funktionen", pp. 17–24.

Funkschau 6/98: R. Sietmann Ringen um die UMTS–Schnittstelle, pp. 76–81.

IEEE Communications Magazine, Jan. 1995, pp. 50–57, Falconer et al, Time Division Multiple Access Methods for Wireless Personal Communications.

ITU–T Recommendation v.24, (1993) pp. 1–19.

Publikation: Vortrag von A Elberse, et al, DECT Data Services—DECT in Fixed and Mobile Networks, (1996), pp. 1–12.

Components 31 (1993) Heft 6, S. Althammer, et al., Hochoptimierte IC's fur DECT—Schnurlostelefone, pp. 215–218.

* cited by examiner

# METHOD FOR CONTROLLING DATA TRANSMISSION IN A WIRELESS V.24 DATA TRANSMISSION SYSTEM OPERATING BETWEEN A DATA TERMINAL AND A DATA TRANSMISSION DEVICE FOR DATA TELECOMMUNICATION

BACKGROUND OF THE INVENTION

1. Field of the Invention

The present invention generally pertains to wireless data transmission systems. In particular, the present invention pertains to data transmission in wireless data transmission systems.

2. Discussion of the Related Art

Data telecommunication comprises the reciprocal sending and receiving of data or data signals (packet data) between a data terminal, for example a personal computer, data terminal, data processing system etc., and a remote data terminal, for example a personal computer, data terminal, data processing system etc., over a telecommunication network, for example a public telecommunication network (such as ISDN, PSTN, etc.). To enable the data or data signals sent by the data terminal to be transmitted over the tele-communication network, a technical network device, the so-called data transmission device, is arranged between the data terminal and the tele-communication network. Besides the PC card, formerly known as PCMCIA card, the most commonly used data transmission device is the modem, which is a contraction of modulator/demodulator.

The modem is an electrical data transmission device that operates on the basis of carrier current for use on analog transmission paths having a limited bandwidth, e.g. telecommunication lines, such as a/b line pair, ISDN S0 bus etc., of the telecommunication network, which converts digital data signals into analog data signals and vice versa and transmits them. A large number of V-series Methods standardized by the International Telecommu-nication Union—Telecommunication Standards (ITU-T) are also implemented in modems.

According to the ITU-T V.24 specification of March 1993, pages 1 to 19, a V.24 cable or a V.24 interface KV.24 supports modem operation on a personal computer over various lines known as status lines. These lines are namely: 1. a transmit data line TxD for data transmission; 2. a receive data line RxD for data transmission; 3. an RTS line (Ready To Send) RTS for the "hardware handshake" transmission mode for transmitting the status "READY TO SEND" (status "RTS"); 4. a CTS line (Clear To Send) CTS for the "hardware handshake" transmission mode for transmitting the status "CLEAR TO SEND" (status "CTS"); 5. an RI line (Ring Indication) RI for call detection at the modem; 6. a DSR line (DATA SET READY) DSR on which the modem signals the personal computer that it is switched on; 7. a DTR line (DATA TERMINAL READY) DTR on which the personal computer signals the modem that it is switched on and ready to establish connections; 8. a DCD line (DATA CHANNEL DETECTION) DCD on which the modem signals the personal computer that it has established the connection to a remote modem; and 9. a ground line (GrouND) GND.

If the V.24 cable or the V.24 interface KV.24 does not have the nine lines enumerated above, but has fewer than nine, for example seven, then this 7-conductor cable can nevertheless support modem operation on the personal computer. This is performed by using, instead of "hardware handshaking" on the RTS/CTS lines, a "software handshake" transmission mode for transmitting the statuses "RTS", "CTS"—for example using an XON/XOFF protocol—on the transmit/receive data lines TxD, RxD. With "software handshaking" the data stream transmitted between the data terminal DEE and the data transmission device DšE is analyzed in the data terminal DEE and the data transmission device DšE, all "software handshake characters" are interpreted, and actions are initiated accordingly.

Air interfaces are wireless telecommunication interfaces in which messages are wirelessly transmitted over a long-distance transmission path between a message source and a message sink on the basis of various communication methods FDMA (Frequency Division Multiple Access), TDMA (Time Division Multiple Access) and/or CDMA (Code Division Multiple Access), are set forth according to radio standards such as DECT [Digital Enhanced (formerly: European) Cordless Telecommunication; cf. Nachrichten technik Elektronik 42 (1992) Jan./Feb. No.1, Berlin, DE; U. Pilger "Struktur des DECT-Standards" (Structure of the DECT standard), pages 23 to 29 in conjunction with the ETSI publication ETS 300175-1.9, October 1992 and the DECT publication of the DECT-Forum, February 1997, pages 1 to 16], GSM [Groupe Sp‚ciale Mobile or Global System for Mobile Communication; cf. Informatik Spektrum 14 (1991) June, No. 3, Berlin, DE; A. Mann: "Der GSMS-Standard—Grundlage for digitale Europische Mobilfunknetze" (The GSM Standard—Basis for Digital European Mobile Radio Networks), pages 137 to 152 in conjunction with the publication telekom praxis 4/1993, P. Smolka "GSM-Funkschnittstelle—Elemente und Funktionen" (GSM radio interface—elements and functions), pages 17 to 24], UMTS [cf. Funkschau 6/98: R. Sietmann "Ringen urn die UMTS-Schnittstelle" (Battle for the UMTS interface), pages 76 to 81], WACS or PACS, IS-54, IS-95, PHS, PDC etc. See also, IEEE Communications Magazine, January 1995, pages 50 to 57; D. D. Falconer et al: "Time Division Multiple Access Methods for Wireless Personal Communications".

According to the publication "Vortrag von A. Elberse, M. Barry, G. Fleming zum Thema: "DECT Data Services—DECT in Fixed and Mobile Networks", 17/18 June 1996, Sofitel Hotel, Paris; pages 1 to 12 and abstract" DECT Technology, based on the journal "Nachrichtentechnik Elektronik 42 (1992) Jan./Feb. No. 1, Berlin, DE. See also, U. Pilger "Struktur des DECT-Standards" (Structure of the DECT Standard), pages 23 to 29 in conjunction with the ETSI publication ETS 300175-1.9, October 1992 and the Journals Components 31 (1993), Issue 6, pages 215 to 218; S. Althammer. D. Brockmann: "Hochoptimierte IC's for DECT-Schnurlostele-fone" (Super-optimized Ics for DECT cordless telephones), and WO 96/38991. The principal application of DECT (Digital Enhanced Cordless Telecommunication) technology will be in the area of wireless mobile telecommunication of voice and/or packet data, in which, as a result of the DECT network access technology, the user can be both his own network operator and can access a higher telecommunication network for long-distance transmission of user data.

SUMMARY OF THE INVENTION

It is an object of the present invention to provie a method for controlling control the transmission of control commands or control information for the data transmission device from the data terminal to the data transmission device in a wireless V.24 data transmission system operating between a data terminal and a data transmission device for data telecommunication.

It is another object of the invention to provide such a way that the recognizability of control commands or control information for the data transmission device is ensured.

These and other objects of the invention will become apparent upon careful review of the detailed description of the preferred embodiments which is to be read in conjunction with a review of the drawing figures.

DETAILED DESCRIPTION OF THE PREFERRED EMBODIMENTS

Figure 1:
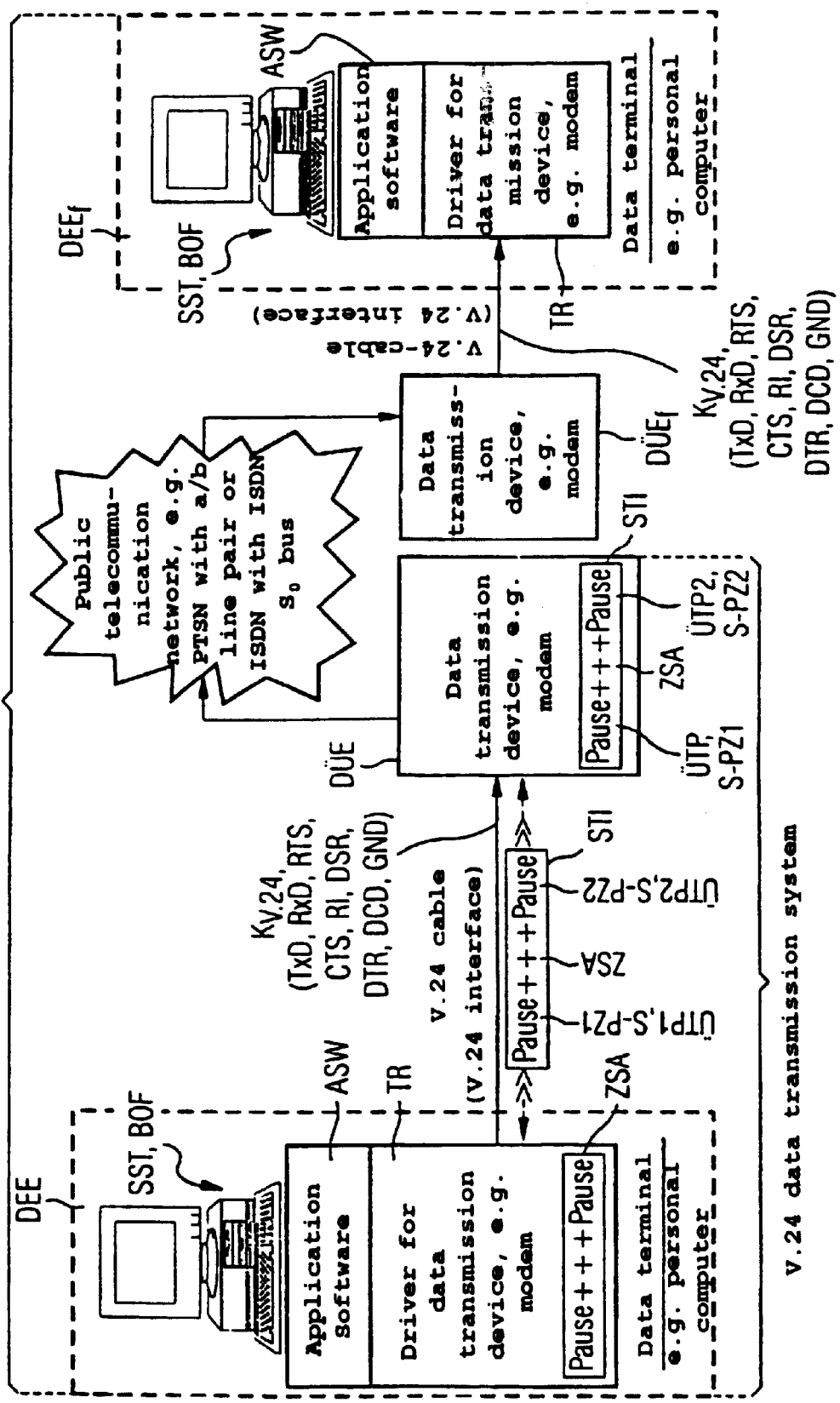
FIG. 1 shows a data telecommunication system based on a V.24 data transmission system.

FIG. 1 shows a data telecommunication scenario based on a V.24 data transmission system. The V.24 data transmission system is connected to a remote V.24 data transmission system via a public telecommunication network, e.g. a PSTN (Public Switched Telecommunication Network) having an a/b line pair or an ISDN (Integrated Services Digital Network) having an ISDN S0 bus. The V.24 data transmission system has a data terminal DEE that takes the form, for example, of a personal computer, and a data transmission device DšE that takes the form, for example, of a modem, which are interconnected by means of a V.24 cable (V.24 interface) KV.24.

Analogously, the remote V.24 data transmission system has a remote data terminal DEEf that takes the form of a personal computer, and a remote data transmission device D šEf that takes the form of a modem, which are likewise interconnected by means of a V.24 cable (V.24 interface) KV.24.

The data terminal DEE, DEEf contains a system controller SST with user interface BOF, application software ASW and a driver TR as adapter element between the software (application software) and hardware (data transmission device or modem).

The driver TR is specific to the particular modem manufacturer and preferably takes the form of a CAPI driver (Common ISDN Application Programmable Interface; standardized communication interface for application software for fault-tolerant ISDN telecommunication with the personal computer) or a TAPI driver (Telephone Application Programmable Interface).

A large number of data transmission devices DšE available on the market, e.g. analog modems and external PC ISDN terminal adapters, are controlled by means of a HAYES command set (HAYES standard). The HAYES standard was originally an American industry standard for modem communications, in particular for modem control by the data terminal DEE. It is also referred to as the AT standard as nearly all the commands in the HAYES command set begin with the prefix "AT" (Attention) with the ASCII characters A and T. Now introduced worldwide, said standard forms the basis of an ITU recommendation (International Telecommunication Union) having the designation "ITU-T V.25ter". Instead of the prefix "AT", it is also possible to use the prefix "at", the prefix "A/" or the prefix "a/".

The AT commands are used in a command data transmission mode ("command mode") at the data transmission device (modem) DšE to control, inter alia, establishment of the connection to the remote data transmission device, the D šEf modem, at the remote end of the telephone line. If this connection establishment is successful, the modem switches from the initial "command mode" into a user data transmission mode, referred to as "transparent mode". Thus, a "point-to-point" connection ("end-to-end" connection) to the modem at the remote end. The actual user data transmission of the application software ASW takes place in this mode.

The interpretation of AT commands is switched off for this in order to prevent an inadvertent interpretation of any "AT" character strings that might occur in the user data stream. As a result, however, there can clearly be no AT command for switching back from "transparent mode" into "command mode".

In order to enable switching over, in a user data transmission mode of the wireless V.24 data transmission system time-critical control information (control command) STI, which can be changed by the user of the data terminal DEE and which consists of a first transmission pause šTP1 having a first nominal pause time S-PZ1, followed by a character set (character string) ZSA and followed by a second transmission pause šTP2 having a second nominal pause time S-PZ2, is transmitted with defined timing in a user data stream NDS from the data terminal DEE to the data transmission device DšE. Control information STI is known both to the modem driver TR of the data terminal DEE and to the data transmission device DšE or modem.

The probability of this control information STI occurring in the user data stream NDS with exactly the defined timing is extremely low. Said control information STI is also referred to as the ESCAPE sequence and it is usually given by coded ASCII characters in the form "Pause+++Pause", with the information "Pause" having a defined minimum value. The information "Pause" before the first "+" character of the character set ZSA specifies the pause time of the first transmission pause šTP1, while the information "Pause" after the last "+" character of the character set ZSA specifies the pause time of the second transmission pause šTP2.

The ITU-T V.24 specification, the V.24 cable or the V.24 interface KV.24, supports modem operation on a personal computer over various lines known as status lines. Namely, the lines are: 1. a transmit data line TxD for data transmission; 2. a receive data line RxD for data transmission; 3. an RTS line (Ready To Send) RTS for the "hardware handshake" transmission mode for transmitting the status "READY TO SEND" (status "RTS"); 4. a CTS line (Clear To Send) CTS for the "hardware handshake" transmission mode for transmitting the status "CLEAR TO SEND" (status "CTS"); 5. an RI line (Ring Indication) RI for call detection at the modem; 6. a DSR line (DATA SET READY) DSR on which the modem signals the personal computer that it is switched on; 7. a DTR line (DATA TERMINAL READY) DTR on which the personal computer signals the modem that it is switched on and ready to establish connections; 8. a DCD line (DATA CHANNEL DETECTION) DCD on which the modem signals the personal computer that it has established the connection to a remote modem; 9. a ground line (GrouND) GND.

If the V.24 cable or the V.24 interface KV.24 does not have the nine lines enumerated above, but has fewer than nine, for example seven, then this 7-conductor cable can nevertheless support modem operation on the personal computer. This is performed by using, instead of "hardware handshaking" on the RTS/CTS lines, a "software handshake" transmission mode for transmitting the statuses "RTS", "CTS"—for example using an XON/XOFF protocol—on the transmit/receive data lines TxD, RxD. With "software handshaking" the data stream transmitted between the data terminal DEE and the data transmission device DšE is analyzed in the data terminal DEE and the data transmission device DšE, all "software handshake characters" are interpreted, and actions are initiated accordingly.

Where the data terminal DEE and the data transmission device DšE are spatially separate, that is, more than several meters apart, the wire-connected V.24 data transmission system shown in FIG. 1 has the disadvantage that a correspondingly long V.24 cable KV.24 appropriate to the spatial arrangement of data terminal DEE and data transmission device DšE is required for data telecommunication, and given such cable lengths, a large cost is incurred for laying the cable is incurred for installation of the system.

Analogous to wireless telephony, it is therefore desirable and also conceivable to replace the wire-connected V.24 data transmission system by a wireless V.24 data transmission system.

Figure 2:
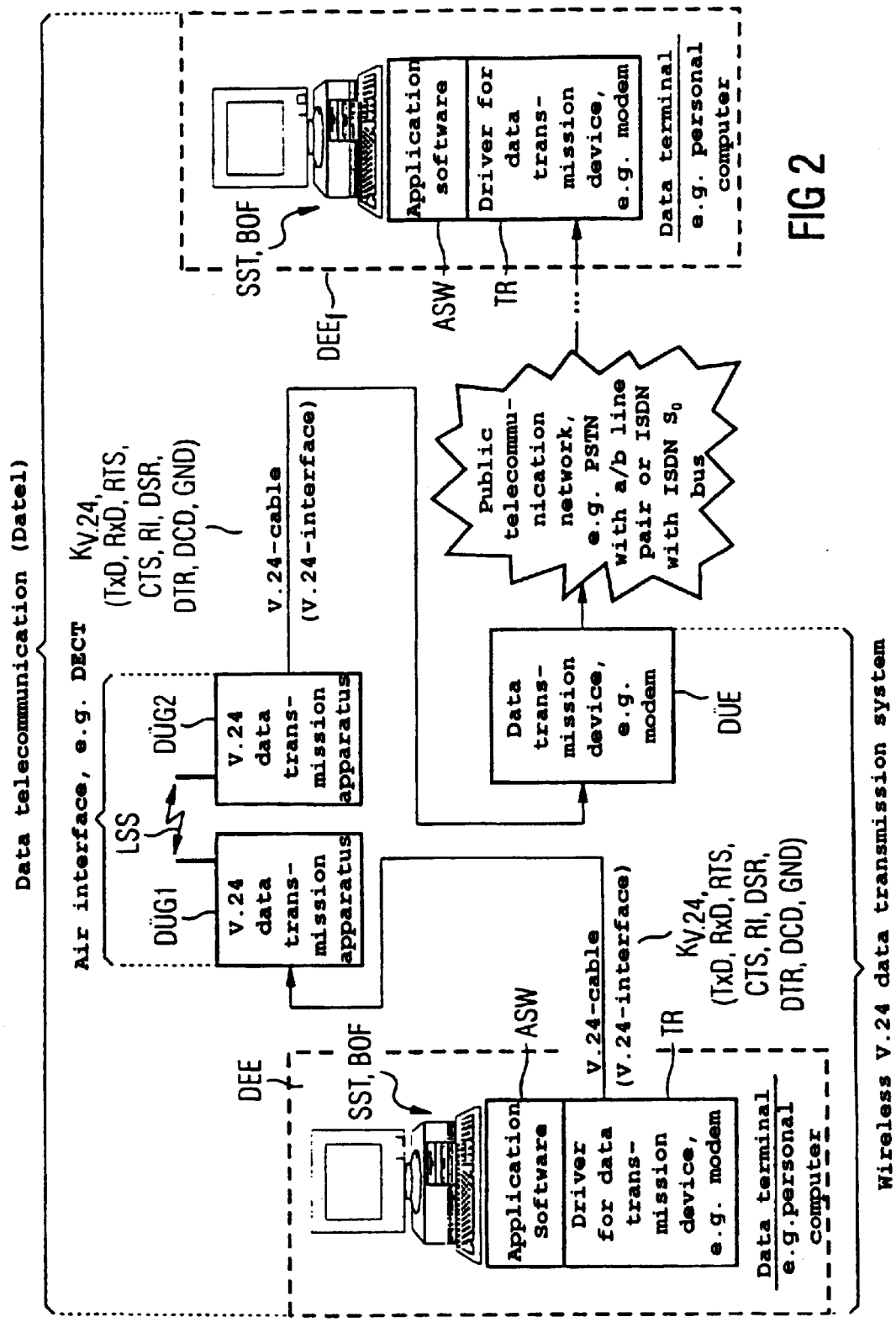
FIG. 2 shows such a wireless V.24 data transmission system for data telecommunication.

FIG. 2 shows such a wireless V.24 data transmission system for data telecommunication. The remote V.24 data transmission system may be wire-connected as in FIG. 1 or may be wireless like the wireless V.24 data transmission system in FIG. 2.

In comparison with the wire-connected V.24 data transmission system shown in FIG. 1, in the wireless V.24 data transmission system the V.24 cable or the V.24 interface KV.24 is cut and a data transmission apparatus is connected in each case at the two cable ends created by cutting.

The two data transmission apparatuses, a first data transmission apparatus DšG1 connected to the data terminal DEE by means of the V.24 cable or the V.24 interface KV.24 and a second data transmission apparatus DšG2 connected to the data transmission device DšE by means of the V.24 cable or the V.24 interface KV.24, are connected to each other by means of an air interface LSS for wireless telecommunication.

Air interfaces are wireless telecommunication interfaces in which messages are wirelessly transmitted over a long-distance transmission path between a message source (e.g. first data transmission apparatus DšG1) and a message sink (e.g. second data transmission apparatus DšG2) on the basis of various communication methods FDMA (Frequency Division Multiple Access), TDMA (Time Division Multiple Access) and/or CDMA (Code Division Multiple Access).

In FIG. 2 the DECT air interface is preferably provided as the air interface LSS.

The present invention is based on a wireless V.24 data transmission system operating between a data terminal (e.g. a personal computer) and a data transmission device (e.g. a modem) for data telecommunication and having a first data transmission apparatus connected to the data terminal by means of a V.24 cable and having a second data transmission apparatus connected to the data transmission device by means of a V.24 cable, which apparatuses may in turn be connected by means of wireless telecommunication via an air interface, once the time-critical control command, e.g. the ESCAPE sequence, has been made known in the data transmission apparatuses, by observing the timing information (e.g. the pause times contained in the ESCAPE sequence) contained in the control command, after transmission has been completed on the transmission path between the first data transmission apparatus and the data terminal, the time sequence of the transmission of the control command on the transmission path between the second data transmission apparatus and the data transmission device is identically reconstructed, despite the asynchronous data transmission caused by the air interface in the wire less V.24 data transmission system.

An exemplary embodiment of the present invention will be explained with reference to FIG. 3.

Figure 3:
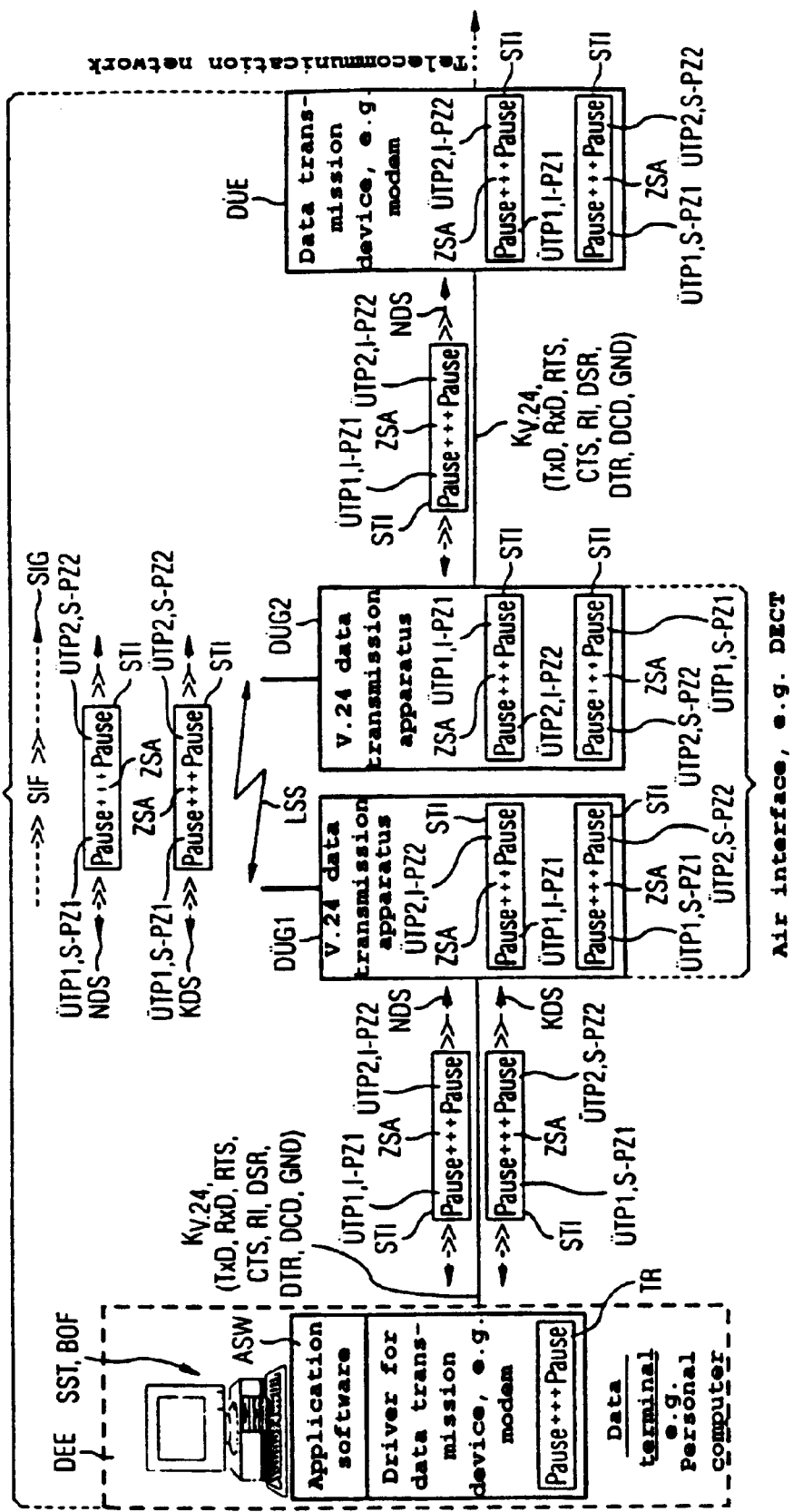
FIG. 3 shows the wireless V.24 data transmission system according to the present invention.

FIG. 3 shows a wireless V.24 data transmission system in which data transmission is controlled as follows:

When the wireless V.24 data transmission system is put into operation, or when the data terminal DEE, the data transmission device DšE and the V.24 data transmission apparatuses DšG1, DšG2 are switched on, the V.24 data transmission apparatuses DšG1, DšG2, the data terminal DEE and the data transmission device DšE are operated in a command data transmission mode in which command data are transmitted between the data terminal DEE and the data transmission device DšE over the V.24 cable KV.24 and the air interface LSS.

The time-critical ESCAPE sequence STI, which can be changed by the user of the data terminal DEE and is known to the data terminal DEE and to the data transmission device DšE, is made known to the V.24 data transmission apparatuses DšG1, DšG2, in that 1. If the ESCAPE sequence STI has not been changed, the ESCAPE sequence STI is pre-configured in the V.24 data transmission apparatuses DšG1, DšG2, or 2. if the ESCAPE sequence STI has been changed, preferably the first V.24 data transmission apparatus DšG1 determines the changed ESCAPE sequence STI transmitted in a command data transmission mode of the data terminal DEE, the data transmission device DšE and the V.24 data transmission apparatuses DšG1, DšG2 in a command data stream KDS from the data terminal DEE to the data transmission device DšE and notifies the second V.24 data transmission apparatus DšG2 of this changed control information STI.

It is also possible that the second V.24 data transmission apparatus DšG2 determines the changed ESCAPE sequence STI transmitted in the command data transmission mode of the data terminal DEE, the data transmission device DšE and the V.24 data trans-mission apparatuses DšG1, DšG2 in the command data stream KDS from the data terminal DEE to the data transmission device DšE and notifies the first V.24 data transmission apparatus DšG1 of this changed ESCAPE sequence STI, or the two V.24 data transmission apparatus DšG1, DšG2 determine the changed ESCAPE sequence STI transmitted in the command data transmission mode of the data terminal DEE, the data transmission device DšE and the V.24 data transmission apparatuses DšG1, DšG2 in the command data stream KDS from the data terminal DEE to the data trans-mission device DšE.

In the latter case, there is no transmission of the ESCAPE sequence STI between the V.24 data transmission apparatuses DšG1, DšG2.

In the user data transmission mode of the data terminal DEE, the data transmission device DšE and the V.24 data transmission apparatus DšG1, DšG2, the first V.24 data transmission apparatus DšG1 determines from the user data stream NDS sent from the data terminal DEE to the data transmission device DšE a first actual pause time I-PZ1 of the first transmission pause šTP1 of the ESCAPE sequence STI which immediately precedes the transmission of the first character of the character set ZSA of the ESCAPE sequence STI, and a second actual pause time I-PZ2 of the second transmission pause šTP2 of the ESCAPE sequence STI which immediately follows the transmission of the last character of the character set ZSA.

The first V.24 data transmission apparatus DšG1 compares the first actual pause time I-PZ1 with the first nominal pause time S-PZ1 and the second actual pause time I-PZ2 with the second nominal pause time S-PZ2.

If the result of the comparison is that the first actual pause time I-PZ1 is greater than or equal to the first nominal pause time S-PZ1 or the second actual pause time I-PZ2 is greater than or equal to the second nominal pause time S-PZ2, by means of signaling SIG the first V.24 data transmission apparatus DšG1 transmits in the user data transmission mode special information SIF to the second V.24 data transmission apparatus DšG2 with which the first V.24 data transmission apparatus DšG1 notifies the second V.24 data transmission apparatus DšG2 of the results of this comparison.

In the user data transmission mode the second V.24 data transmission apparatus DšG2 transmits to the data transmission device DšE the user data stream NDS, in which the first transmission pause šTP1 having a third actual pause time I-PZ3 immediately precedes the transmission of the first character of the character set ZSA, in which the third actual pause time I-PZ3 is greater than or equal to the first nominal pause time S-PZ1, and the second transmission pause šTP2 having a fourth actual pause time I-PZ4 immediately follows the transmission of the last character of the character set ZSA, in which the fourth actual pause time I-PZ4 is greater than or equal to the second nominal pause time S-PZ2.

The first actual pause time I-PZ1 and the second actual pause time I-PZ2 are preferably identical, as are the third actual pause time I-PZ3 and the fourth actual pause time I-PZ4, and as are the first nominal pause time S-PZ1 and the second nominal pause time S-PZ2.

Although modifications and changes may be suggested by those skilled in the art to which this invention pertains, it is the intention of the inventors to embody within the patent warranted hereon all changes and modifications that may reasonably and properly come under the scope of their contribution to the art.

What is claimed is:

1. A method for controlling data transmission in a wireless V.24 data transmission system operating between a data terminal and a data transmission device, the V.24 data transmission system having a first V.24 data transmission apparatus and a second V.24 data transmission apparatus interconnected via an air interface, the first V.24 data transmission apparatus being connected to the data terminal, the second V.24 data transmission apparatus being connected to the data transmission device, the data transmission device being connected to a remote data transmission device having a downstream remote data terminal, the method comprising the steps of:

providing the V.24 data transmission apparatuses with time-critical control information known to the data terminal and to the data transmission device which can be changed by the user of the data terminal, wherein if the control information is unchanged, preconfiguring the control information in the V.24 data transmission apparatuses, or if the control information is changed, determining in at least one of the V.24 data transmission apparatuses the changed control information transmitted in a command data transmission mode of the data terminal, the data transmission device and the V.24 data transmission apparatuses in a command data stream from the data terminal to the data transmission device, and notifying the other V.24 data transmission apparatus of the changed control information;

determining in the first V.24 data transmission apparatus, in a user data transmission mode of the data terminal, the data transmission device and the V.24 data transmission apparatuses, from a user data stream sent from the data terminal to the data transmission device, a first actual pause time of a first transmission pause of the control information which immediately precedes the transmission of a first character of a character set of the control information, and a second actual pause time of a second transmission pause of the control information which immediately follows the transmission of the last character of the character set;

comparing in the first V.24 data transmission apparatus, the first actual pause time with a first nominal pause time and the second actual pause time with a second nominal pause time;

transmitting in the user data transmission mode via signaling, from the first V.24 data transmission apparatus special information to the second V.24 data transmission apparatus, notification of the results of the comparison if the comparison shows that the first actual pause time is greater than or equal to the first nominal pause time or the second actual pause time is greater than or equal to the second nominal pause time; and transmitting from the second V.24 data transmission apparatus in the user data transmission mode, to the data transmission device the user data stream in which the first transmission pause, having a third actual pause time immediately precedes the transmission of the first character of the character set, and in which the third actual pause time is greater than or equal to the first nominal pause time, wherein the second transmission pause having a fourth actual pause time immediately follows transmission of the last character of a character set in which the fourth actual pause time is greater than or equal to the second nominal pause time.

2. The method of claim 1, wherein an ESCAPE data sequence is formed as a time-critical control command from the control information, with the character set and the transmission pauses have one of actual pause times or nominal pause times, respectively.

3. The method of claim 2, wherein the first actual pause time and the second actual pause time are identical, the third actual pause time and the fourth actual pause time are identical, and the first nominal pause time and the second nominal pause time are identical.

4. The method of claim 3, wherein the command data are Hayes-specific commands having the Hayes prefix "AT (Attention)".

5. The method of claim 4, wherein a modem is used as the data transmission device and a personal computer is used as the data terminal.

6. The method of claim 5, wherein a DECT air interface is used as the air interface.

* * * * *